(12) United States Patent
Huang

(10) Patent No.: US 11,233,290 B2
(45) Date of Patent: Jan. 25, 2022

(54) BATTERY HOLDER CAPABLE OF SIMPLIFYING ASSEMBLY PROCEDURE

(71) Applicant: Dah-Luen Huang, New Taipei (TW)

(72) Inventor: Dah-Luen Huang, New Taipei (TW)

( * ) Notice: Subject to any disclaimer, the term of this patent is extended or adjusted under 35 U.S.C. 154(b) by 426 days.

(21) Appl. No.: 16/432,856

(22) Filed: Jun. 5, 2019

(65) Prior Publication Data

US 2020/0136103 A1     Apr. 30, 2020

(30) Foreign Application Priority Data

Oct. 24, 2018   (TW) .................................. 107214462
May 14, 2019   (TW) .................................. 108206024

(51) Int. Cl.
*H01M 2/10*          (2006.01)
*H01M 50/213*    (2021.01)

(52) U.S. Cl.
CPC .................................. *H01M 50/213* (2021.01)

(58) Field of Classification Search
None
See application file for complete search history.

(56) References Cited

U.S. PATENT DOCUMENTS

| 4,161,568 A * | 7/1979 | Lund ................... H01M 50/213 |
| | | 429/99 |
| 4,514,477 A * | 4/1985 | Kobayashi ............. A63H 29/24 |
| | | 429/98 |
| 6,326,766 B1 * | 12/2001 | Small .................... H02J 7/0045 |
| | | 320/112 |

* cited by examiner

*Primary Examiner* — Christopher P Domone
(74) *Attorney, Agent, or Firm* — Guice Patents PLLC

(57) ABSTRACT

A battery holder capable of simplifying assembly procedure includes: case body, having at least three battery chambers; and a connection assembly, having at least one anode/cathode connecting unit, an anode output terminal, a cathode output terminal and an anode/cathode jumping unit, thereby allowing the at least three battery chambers to be in a serial connecting status; and characterized in that: an accommodation slot is formed between two of the at least three battery chambers which are arranged at outer sides, the anode/cathode jumping unit is formed through a metal wire being bent, and has a connection segment accommodated in the accommodation slot, one end of the connection segment has a cathode elastic contact point connected to the battery chamber arranged at the outer side, and another end thereof has an anode contact point connected to the other battery chamber arranged at the outer side.

10 Claims, 14 Drawing Sheets

A-A

B-B

BATTERY HOLDER CAPABLE OF SIMPLIFYING ASSEMBLY PROCEDURE

BACKGROUND OF THE INVENTION

1. Field of the Invention

The present invention relates to a battery holder, especially to a battery holder capable of simplifying assembly procedure.

2. Description of Related Art

The battery has been developed for a long time. By utilizing the battery which stores DC power in a columnar body, users are provided with great convenience in operating some electronic products without being limited to a conventional AC power.

As such, a device for accommodating and storing the batteries, for example a battery holder, has been invented. In some applications, the battery holder is integrated into an electronic product, for example a toy, a portable radio or a flashlight, and in other cases, the battery holder is designed to be separable from an electronic product.

The wiring circuit in the battery holder is mostly configured to provide a serial connection of batteries, but it could be also configured to provide a parallel connection of batteries for some applications. As shown in FIG. 1, which is a perspective exploded view illustrating a conventional battery holder; the battery holder includes a case body 1 having at least three battery chambers 11, and a partition plate 12 is provided between every two of the adjacent battery chambers 11 for partition, a connection assembly 2 is assembled by at least one anode/cathode connecting unit 21 disposed in the at least three battery chambers 11, a flexible hook-up wire 24 coupled to an anode contact point 22 and a cathode contact point 23, an anode output terminal 25 and a cathode output terminal 26.

The anode output terminal 25 has an anode conduction hook-up wire 251, and the cathode output terminal 26 has a cathode conduction hook-up wire 261; the anode conduction hook-up wire 251 and the cathode conduction hook-up wire 261 are protruded out from a penetrated hole 13 respectively formed in the two adjacently battery chambers 11, so that the anode conduction hook-up wire 251 and the cathode conduction hook-up wire 261 are adjacently arranged for being conveniently connected to the electronic product to supply DC power to the electronic product, and a lot of conveniences are provided to the users.

For allowing the flexible hook-up wire 24 to be in a jumping status with respect to the anode contact point 22 and the cathode contact point 23, a bottom surface of the case body 1 is formed with an accommodation slot 14 communicated with the anode contact point 22 and the cathode contact point 23 and allowing the flexible hook-up wire 24 to be accommodated. When the flexible hook-up wire 24 is desired to be installed, the case body 1 is reversely disposed, then two distal ends of the flexible hook-up wire 24 are respectively disposed with a combination padding coil 241, the one end of the flexible hook-up wire 24 is inserted into a communication slot 141 and riveted with the anode contact point 22 (or the cathode contact point 23), another end of the flexible hook-up wire 24 is inserted into another communication slot 141 and riveted with the cathode contact point 23 (or the anode contact point 22), so that the flexible hook-up wire 24 is able to be accommodated in the accommodation slot 141, thereby finishing a jumping installing procedure.

However, during the installing procedure of the flexible hook-up wire 24, the operator has be reversely dispose the case body 1 then normally dispose, if the operator is careless, the flexible hook-up wire 24 may be easily fallen out from the accommodation slot 14, and the installing procedure of the flexible hook-up wire 24 has to be repeated. Moreover, the combination padding coils 241 at the two distal ends of the flexible hook-up wire 24 cannot be easily aligned with two connection holes 15 allowing the anode contact point 22 and the cathode contact point 23 to be respectively riveted and positioned, so that the assembly is difficult, and unnecessary labor and working hours are wasted; accordingly, the above-mentioned disadvantages shall be improved.

SUMMARY OF THE INVENTION

One primary objective of the present invention is to provide a battery holder capable of simplifying assembly procedure, in which an anode/cathode jumping unit made of a rigid metal wire, for example a steel spring wire, is utilized for replacing a conventional assembly consisted of the anode contact point, the cathode contact point and the flexible hook-up wire, and the anode/cathode jumping unit is installed from a top end of the case body, thereby overcoming disadvantages of the battery holder being reversely disposed and a hole alignment operation being difficult to be processed.

For achieving said objective, one technical solution provided by the present invention is to provide a battery holder capable of simplifying assembly procedure, which includes a case body and a connection assembly; the case body has at least three battery chambers, the connection assembly has at least one anode/cathode connecting unit, an anode output terminal, a cathode output terminal and an anode/cathode jumping unit, thereby allowing the at least three battery chambers to be in a serial connecting status; the battery holder is characterized in that: an accommodation slot is formed between two of the at least three battery chambers which are arranged at outer sides, the anode/cathode jumping unit is formed through a metal wire being bent, and has a connection segment accommodated in the accommodation slot, one end of the connection segment has a cathode elastic contact point connected to the battery chamber arranged at the outer side, and another end thereof has an anode contact point connected to the other battery chamber arranged at the outer side.

According to one embodiment provided by the present invention, the accommodation slot is transversally disposed on a bottom surface defined between the two battery chambers arranged at the outer sides, and two ends of the accommodation slot are respectively formed with a communication slot at locations corresponding to the two battery chambers arranged at the outer sides and allowing the anode contact point to pass.

According to one embodiment provided by the present invention, the accommodation slot is transversally disposed on a top surface defined between the two battery chambers arranged at the outer sides; wherein a partition plate is provided between every two adjacent battery chambers for partition, wherein the partition plate is perpendicular to the accommodation slot, and a position corresponding to an anode protrusion of a battery located between every two adjacent partition plates and above the case body is vertically extended with a pair of abutting sheets allowing the anode protrusion to pass there between.

According to one embodiment provided by the present invention, the accommodation slot is transversally disposed on a top surface defined between the two battery chambers arranged at the outer sides; wherein a partition plate is provided between every two of the adjacent battery chambers for partition, a plate slot is respectively formed at a location defined between the two battery chambers arranged at the outer sides and at a location defined at the partition plate arranged at a same side with respect to the accommodation slot, and each of the plate slots allows the anode contact point to transversally pass.

According to one embodiment provided by the present invention, the accommodation slot is diagonally disposed on a top surface defined between the two battery chambers arranged at the outer sides; wherein a partition plate is provided between every two of the adjacent battery chambers for partition, each of the partition plates is longitudinally formed with a crossed slot, in a opened status, at a path where the accommodation slot passes, so that the connection segment is able to longitudinally pass each of the crossed slots so as to be accommodated in the accommodation slot.

According to one embodiment provided by the present invention, the accommodation slot is diagonally disposed on a top surface defined between the two battery chambers arranged at the outer sides; wherein a partition plate is provided between every two of the adjacent battery chambers for partition, each of the partition plates is longitudinally formed with a penetrated slot, in a closed status, at a path where the accommodation slot passes, so that the connection segment is able to transversally pass each of the penetrated slots so as to be accommodated in the accommodation slot.

According to one embodiment provided by the present invention, the metal wire is a steel spring wire; the anode contact point has a frame member formed in a geometrical shape; and the frame member is formed in a rectangular shape or an annular shape.

According to one embodiment provided by the present invention, a partition plate is provided between every two of the adjacent battery chambers for partition, and a hanging segment, which can be communicated with each other, is integrally disposed at a location defined between the partition plates disposed corresponding to each of the anode/cathode connecting units and the case body, thereby allowing each of the anode/cathode connecting units to be in a hanging status.

According to one embodiment provided by the present invention, the anode output terminal has an anode conduction hook-up wire, and the cathode output terminal has a cathode conduction hook-up wire; the anode conduction hook-up wire and the cathode conduction hook-up wire are protruded out from a penetrated hole respectively formed in the two adjacently battery chambers, so that the anode conduction hook-up wire and the cathode conduction hook-up wire are adjacently arranged.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
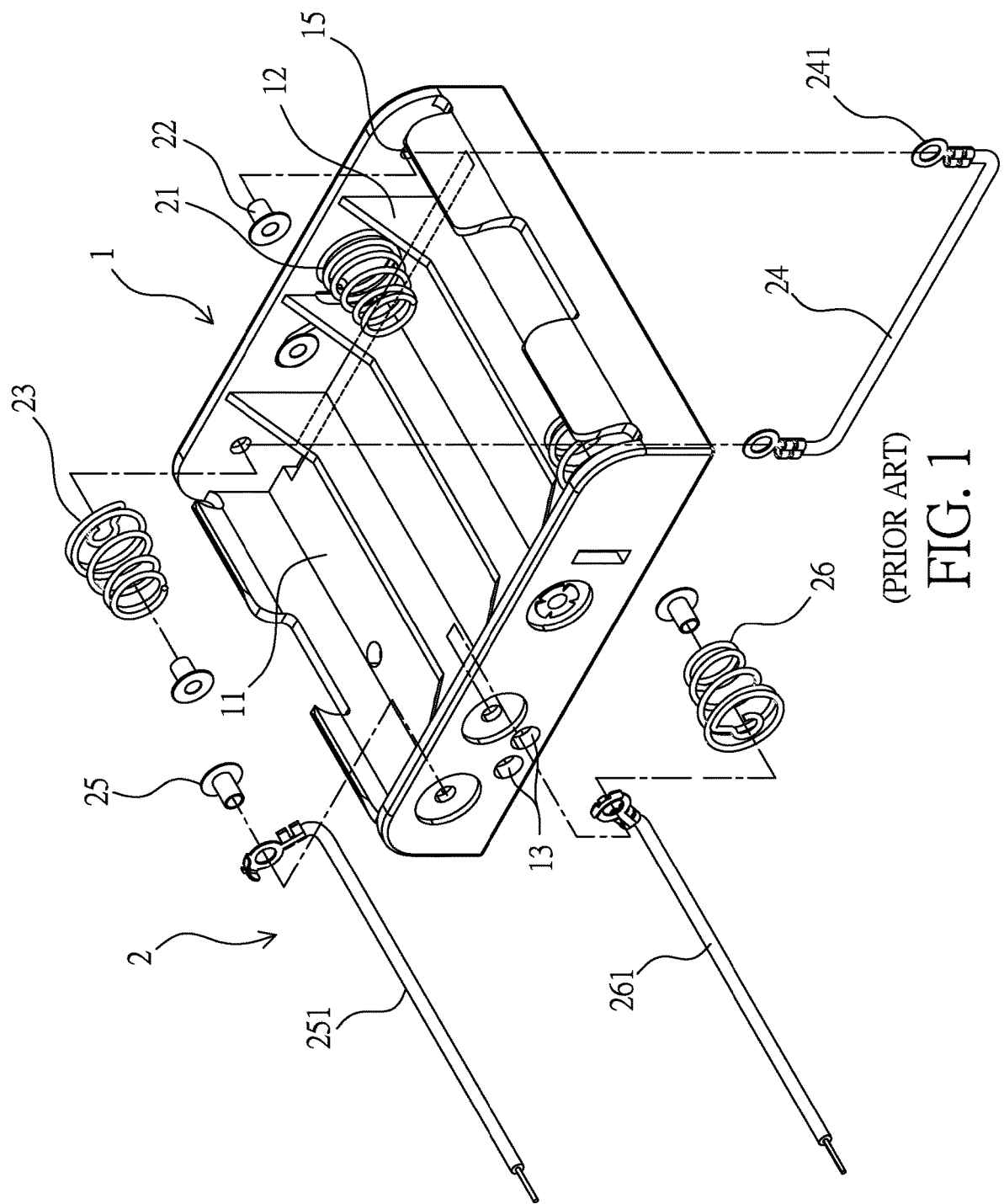
FIG. 1 is a perspective exploded view illustrating a conventional battery holder.
Figure 2:
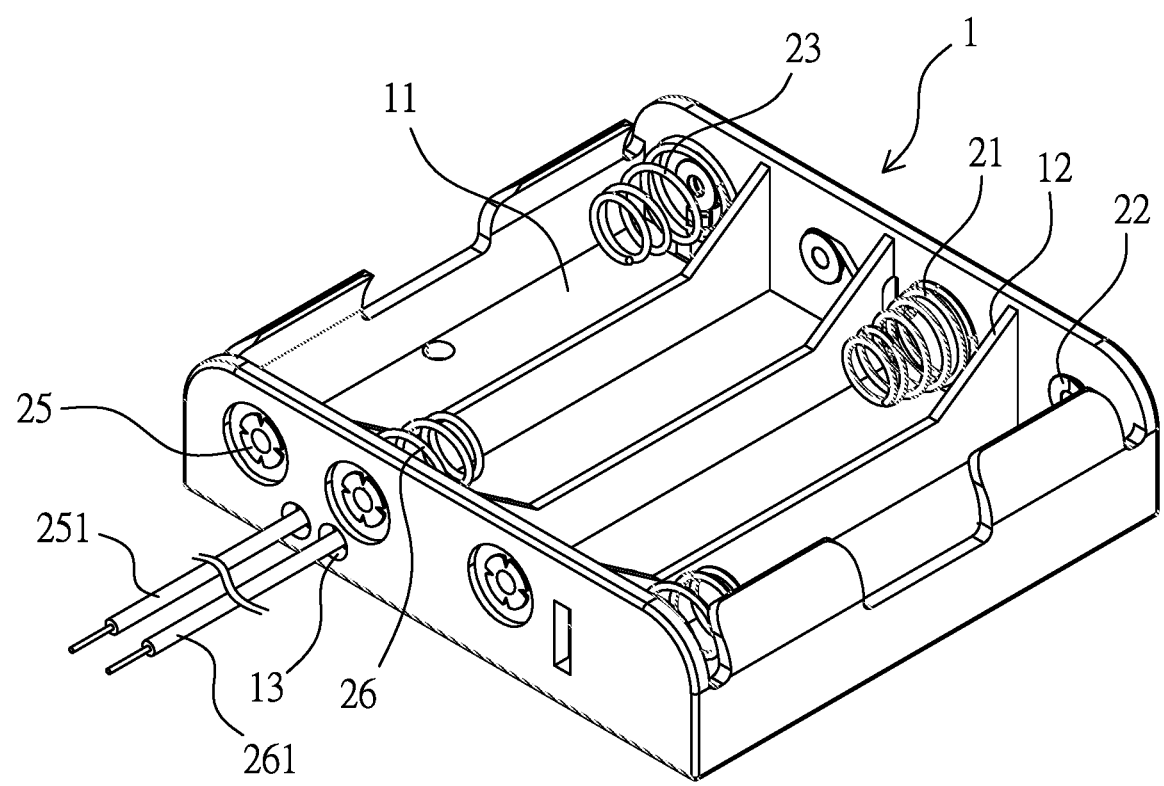
FIG. 2 is a perspective view illustrating the assembly of the battery holder of FIG. 1.
Figure 3:
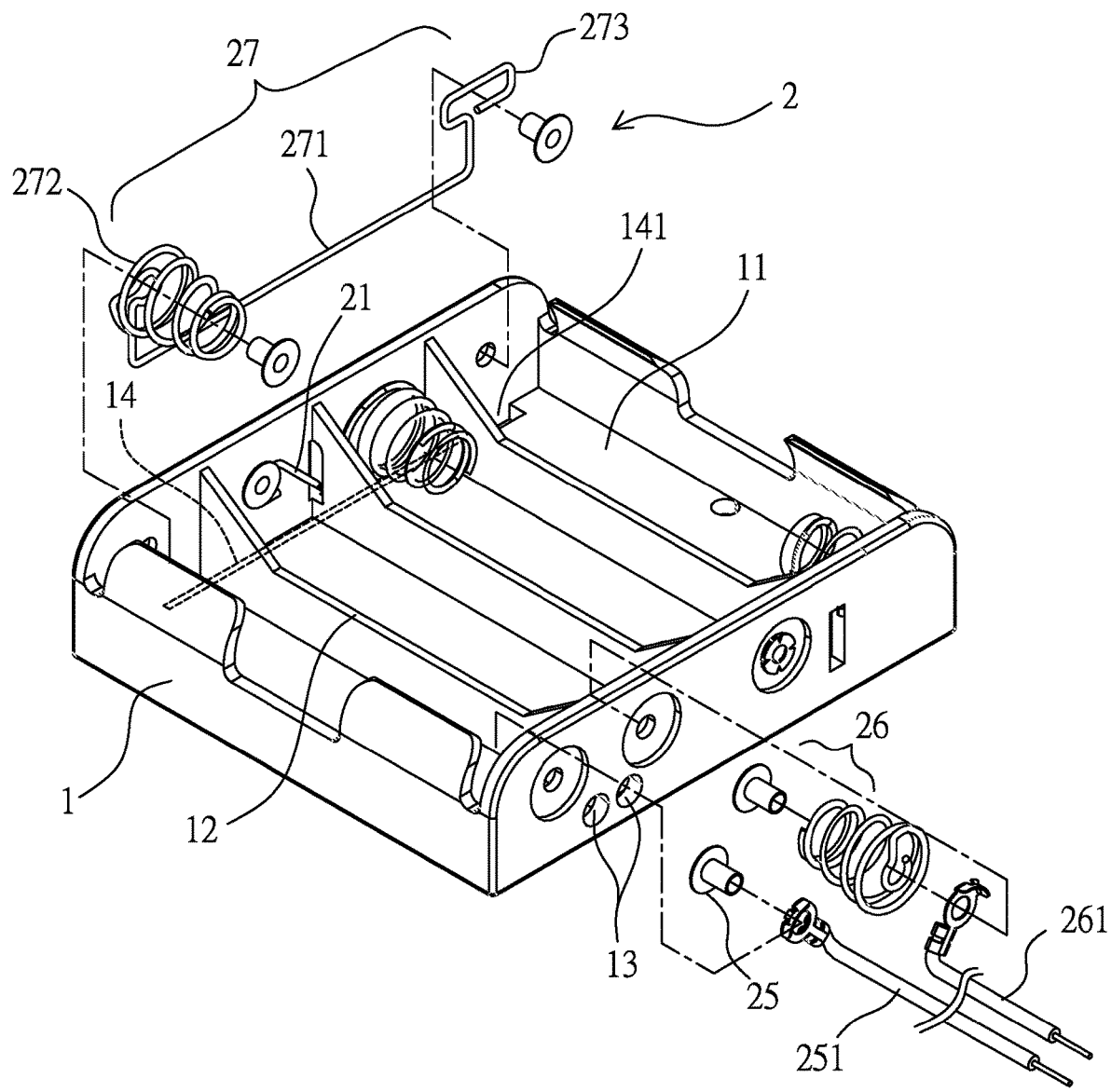
FIG. 3 is a perspective exploded view illustrating a battery holder according to a first embodiment of the present invention.
Figure 4:
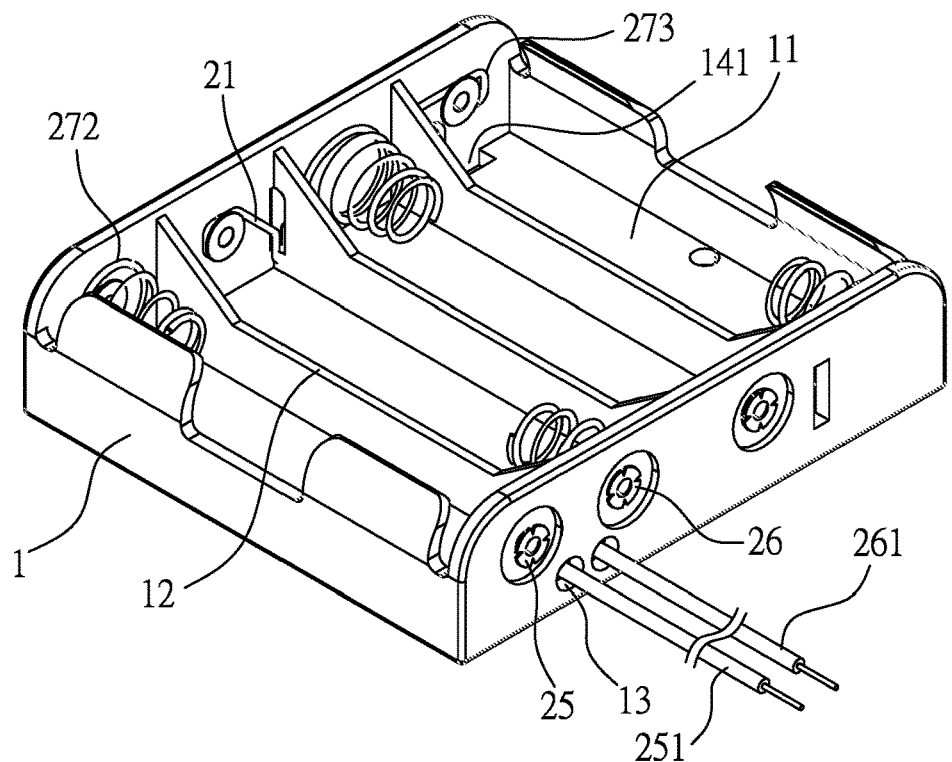
FIG. 4 is a perspective view illustrating the assembly of the battery holder of FIG. 3.
Figure 5:
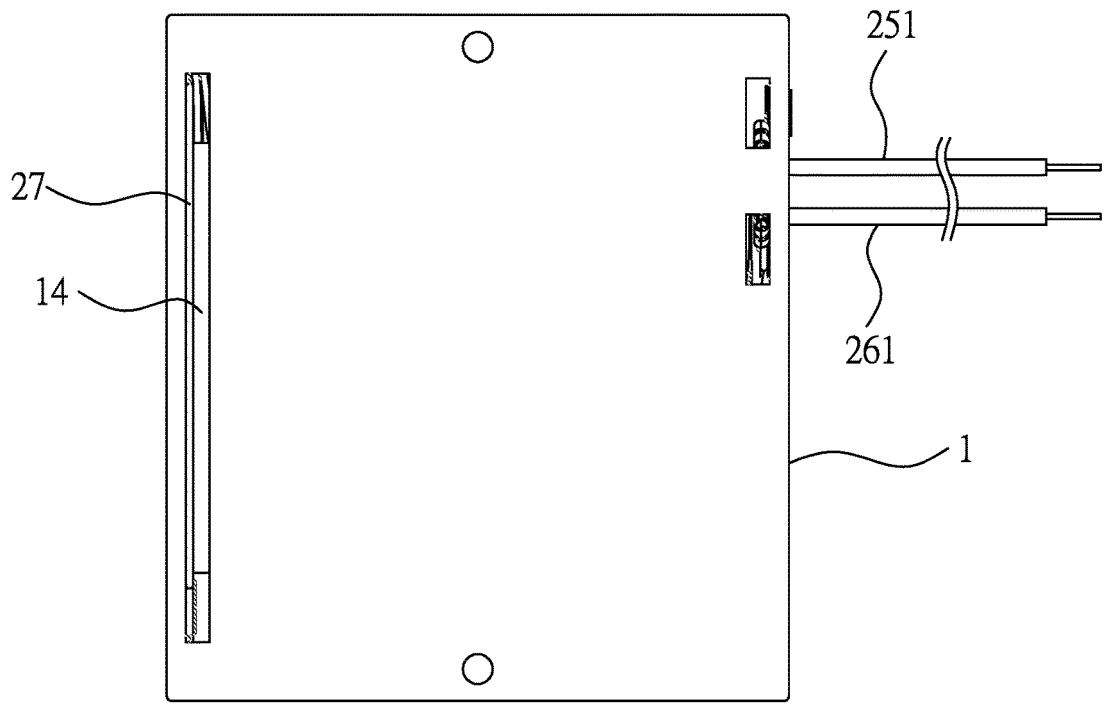
FIG. 5 is a perspective view illustrating the battery holder being reversely disposed according to the first embodiment of the present invention.

Please refer from FIG. 3 to FIG. 5, a battery holder including a case body 1 and a connection assembly 2 is provided according to a first embodiment of the present invention.

The case body 1 is substantially the same as a conventional case body, and has at least three battery chambers 11 as shown in FIG. 3, the quantity of the at least three battery chambers 11 is an even number equal to or greater than three, for example four battery chambers 11; and a partition plate 12 is disposed between every two of the adjacent battery chambers 11 for partition, the connection assembly 2 is disposed in the at least three battery chambers 11, the connection assembly 2 has at least one anode/cathode connecting unit 21, an anode output terminal 25, a cathode output terminal 26 and an anode/cathode jumping unit 27, thereby allowing the at least three battery chambers 11 to be in a serial connecting status.

The anode output terminal 25 has an anode conduction hook-up wire 251, and the cathode output terminal 26 has a cathode conduction hook-up wire 261, the anode conduction hook-up wire 251 and the cathode conduction hook-up wire 261 are protruded out from a penetrated hole 13 respectively formed in the two adjacently-arranged battery chambers 11, so that the anode conduction hook-up wire 251 and the cathode conduction hook-up wire 261 are adjacently arranged for being conveniently connected to an electronic product to supply DC power to the electronic product.

As show in FIG. 5, a bottom surface defined between two of the at least three battery chambers 11, which are arranged at outer sides, is transversally formed with an accommodation slot 14, two ends of the accommodation slot 14 are respectively formed with a communication slot 141 at locations corresponding to the two battery chambers 11 arranged at the outer sides and allowing an anode contact point 273 of the anode/cathode jumping unit 27 to pass.

Figure 6:
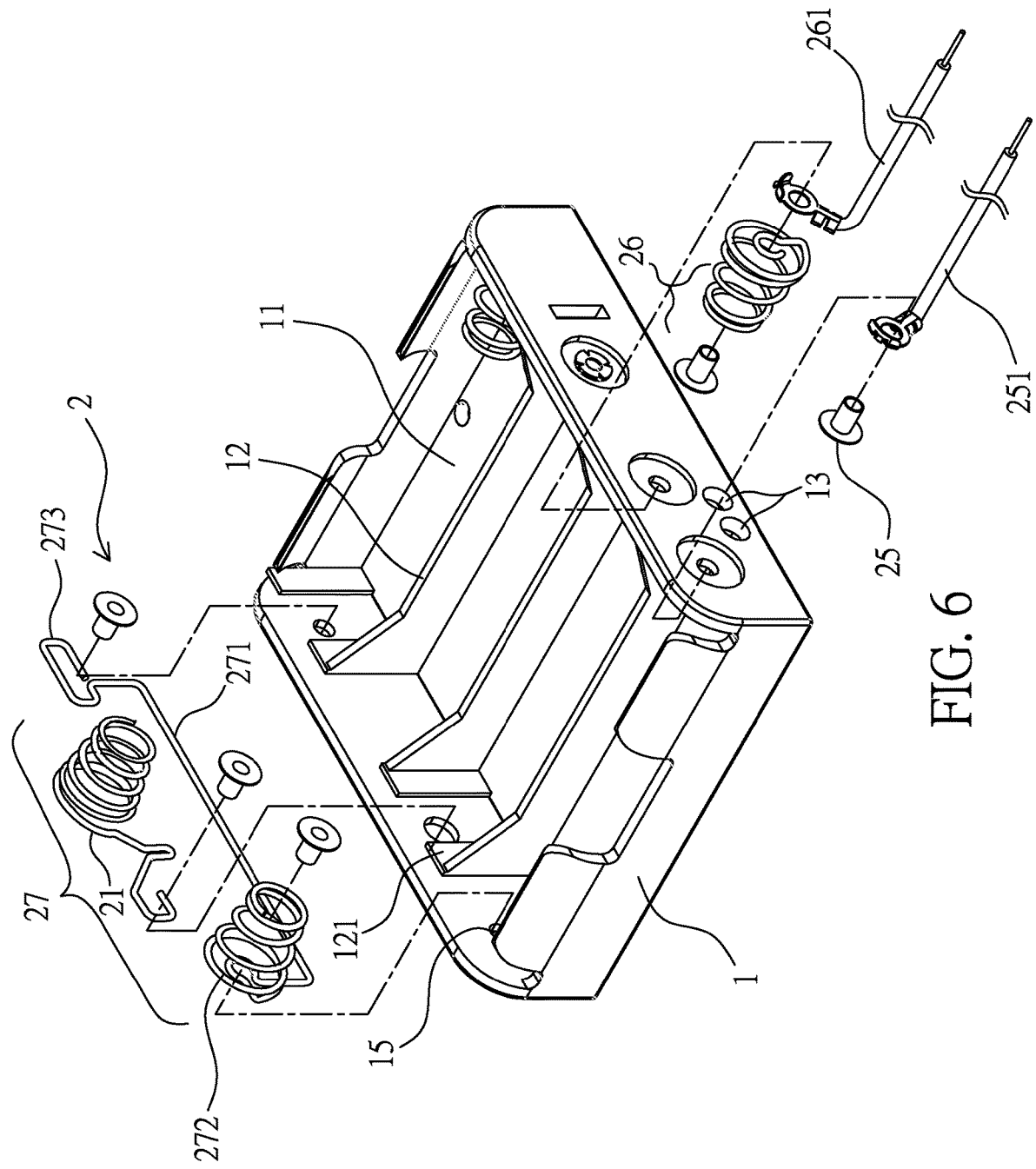
FIG. 6 is a perspective exploded view illustrating the battery holder according to a second embodiment of the present invention.
Figure 9:
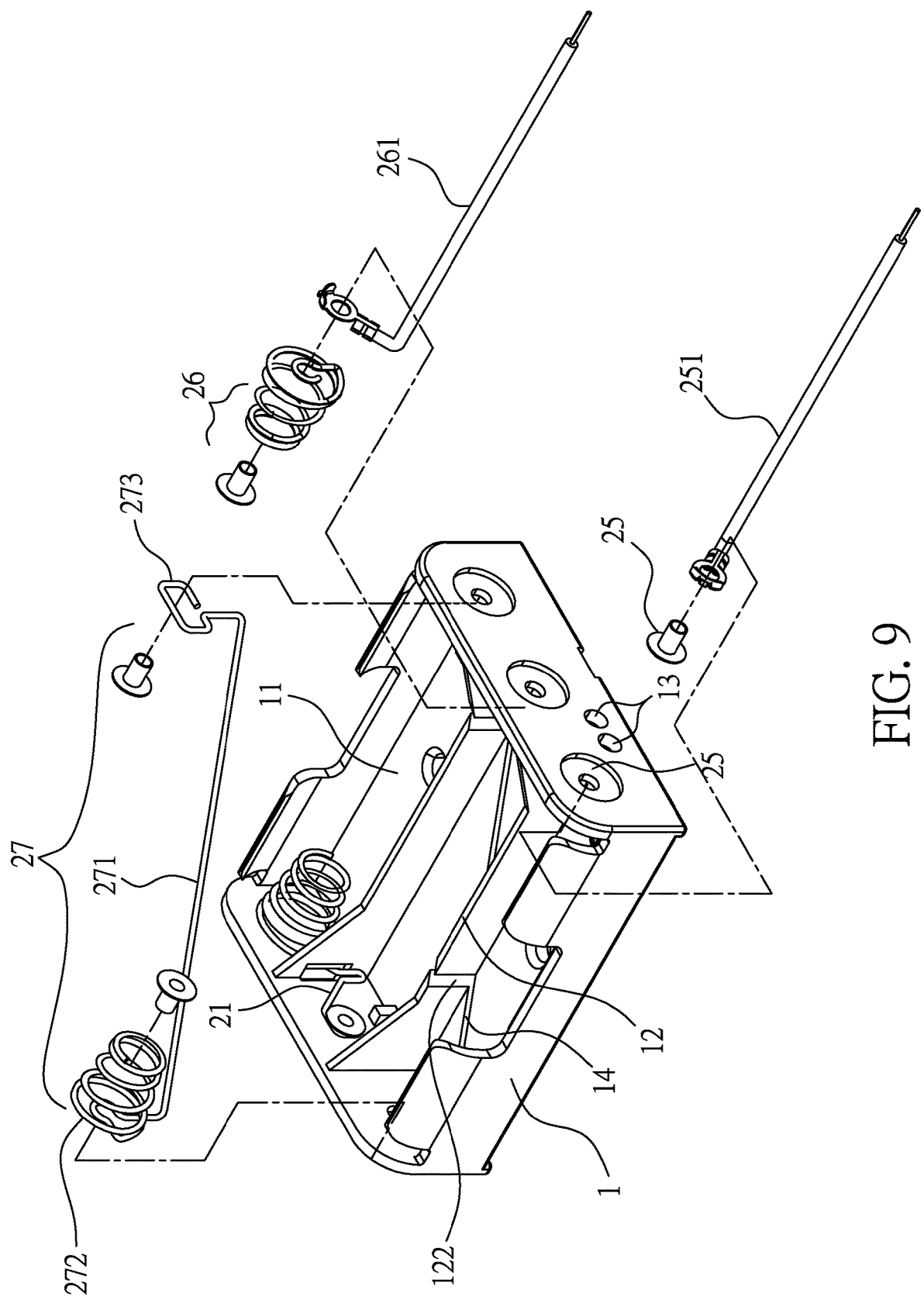
FIG. 9 is a perspective exploded view illustrating the battery holder according to a third embodiment of the present invention.
Figure 12:
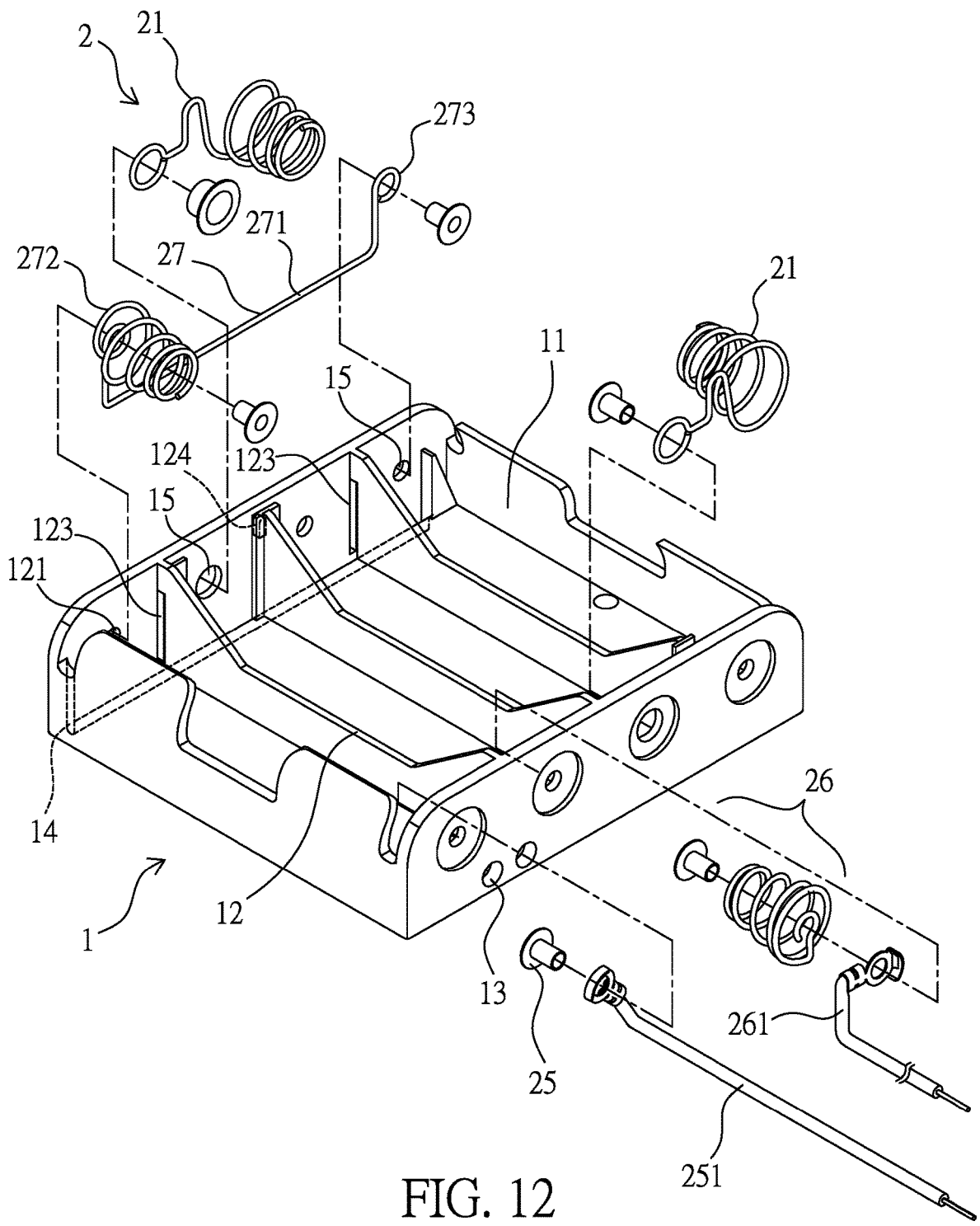
FIG. 12 is a perspective exploded view illustrating the battery holder according to a fourth embodiment of the present invention.
Figure 13:
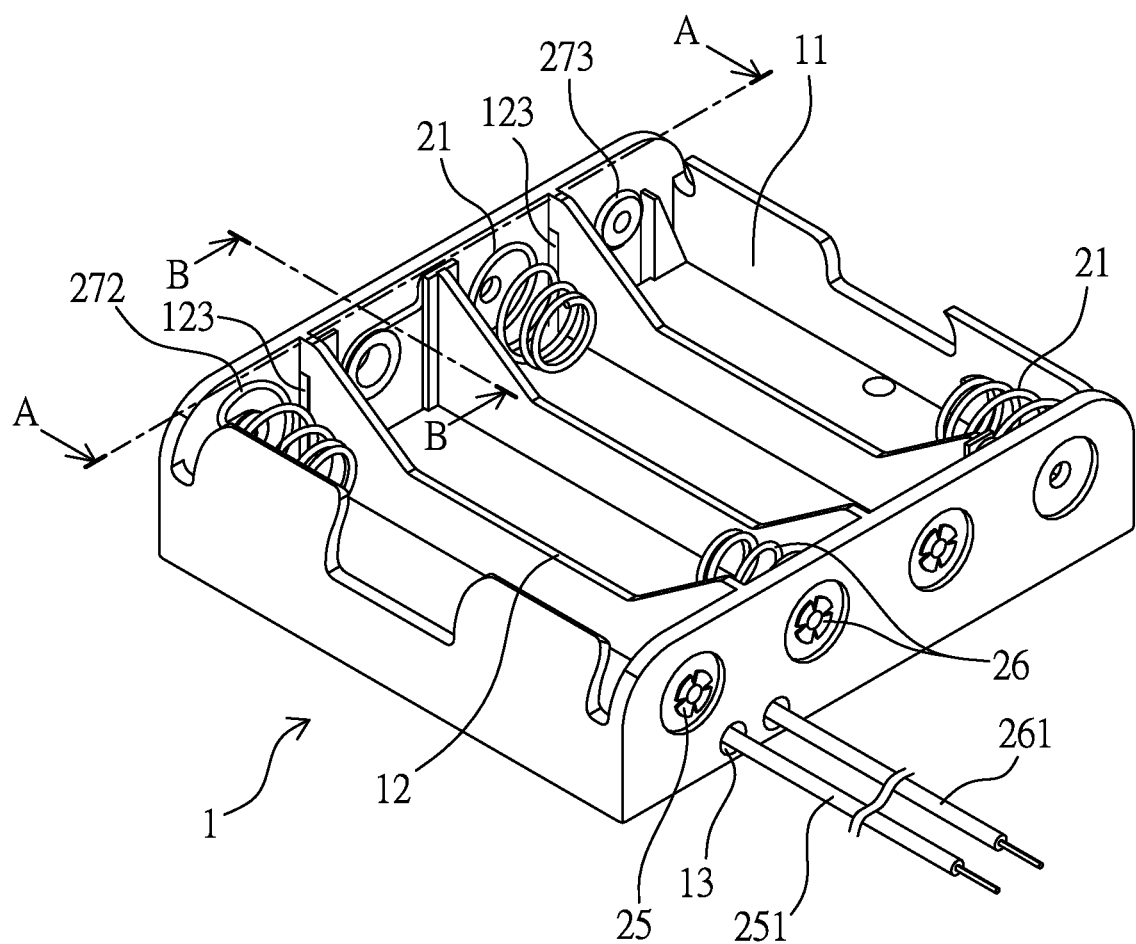
FIG. 13 is a perspective view illustrating the assembly of the battery holder of FIG. 12.
Figure 16:
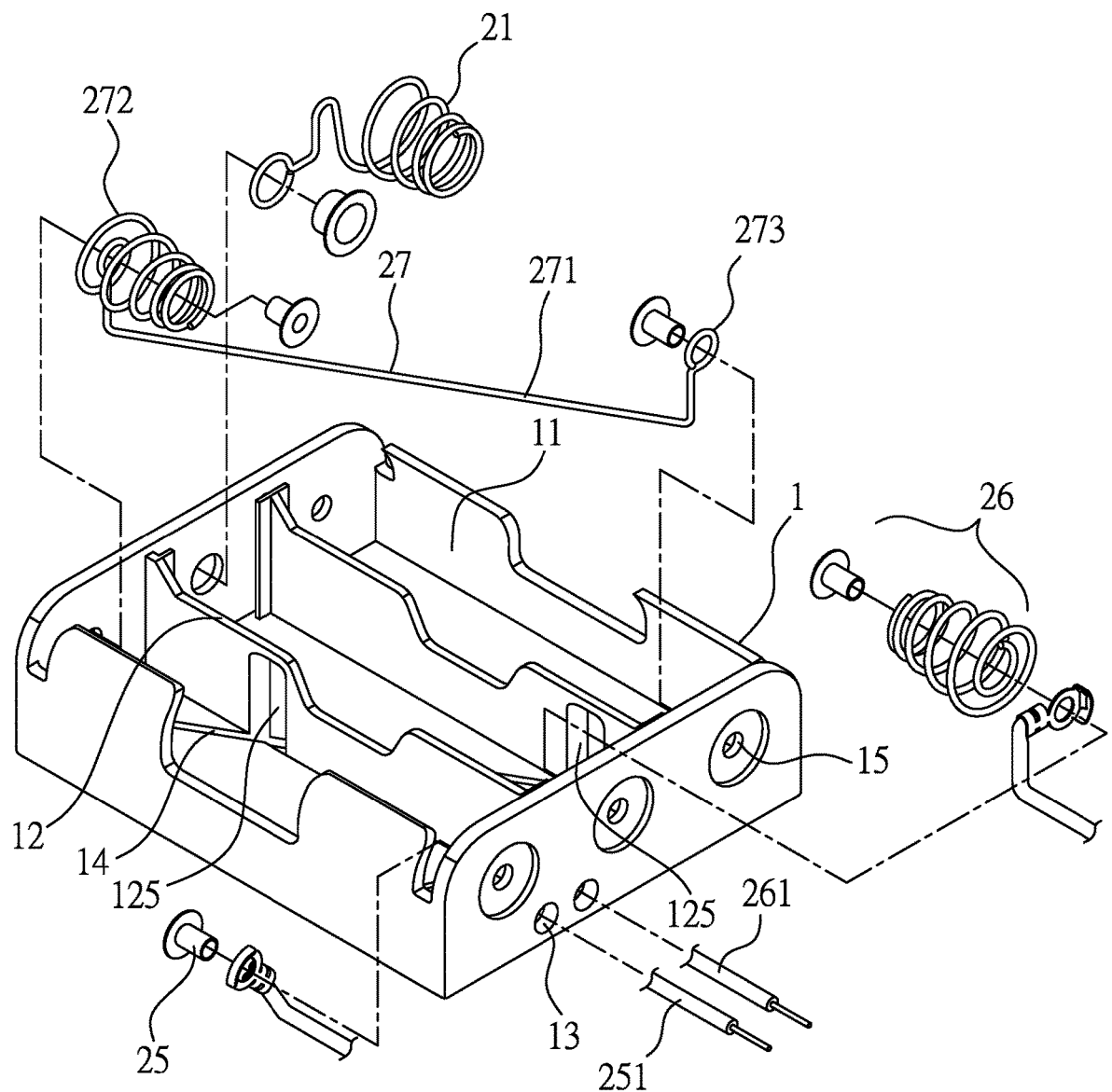
FIG. 16 is a perspective exploded view illustrating the battery holder according to a fifth embodiment of the present invention.

As shown in FIG. 3, the anode/cathode jumping unit 27 is formed through a metal wire, for example a steel spring wire, being bent, and the anode/cathode jumping unit 27 has a connection segment 271, one end of the connection segment 271 has a cathode elastic contact point 272 connected to the battery chamber 11 arranged at the outer side, and another end thereof has the anode contact point 273 connected to the other battery chamber 11 arranged at the outer side. The anode contact point 273 has a frame member formed in a geometrical shape, for example a rectangular shape (as shown in FIG. 3, FIG. 6 and FIG. 9) or an annular shape (as shown in FIG. 12 and FIG. 16).

The anode/cathode jumping unit 27 is formed through a metal wire being bent, and provided with a certain rigidity; when being assembled, the anode contact point 273 firstly passes through one of the communication slots 141 formed at one of the battery chambers 11 at arranged at the outer sides then penetrates out from the other communication slot 141 of the other battery chamber 11 arranged at the outer sides, so that the connection segment 271 is able to be accommodated in the accommodation slot 14, and the cathode elastic contact point 272 is riveted in a connection hole 15 of the case body 1, then the anode contact point 273 is riveted in another connection hole 15 of the case body 1, so that the at least one anode/cathode connecting unit 21, the anode output terminal 25, the cathode output terminal 26 and the at least one anode/cathode jumping unit 27 are assembled as the connection assembly 2.

Based on the above-mentioned assembly procedure, the anode/cathode jumping unit 27 is installed from a top end of the case body 1, thus the complicated assembly procedure of the battery holder being reversely disposed and a hole alignment operation being difficult to be processed are overcome, and objectives of saving labor and saving working hours are achieved.

Figure 7:
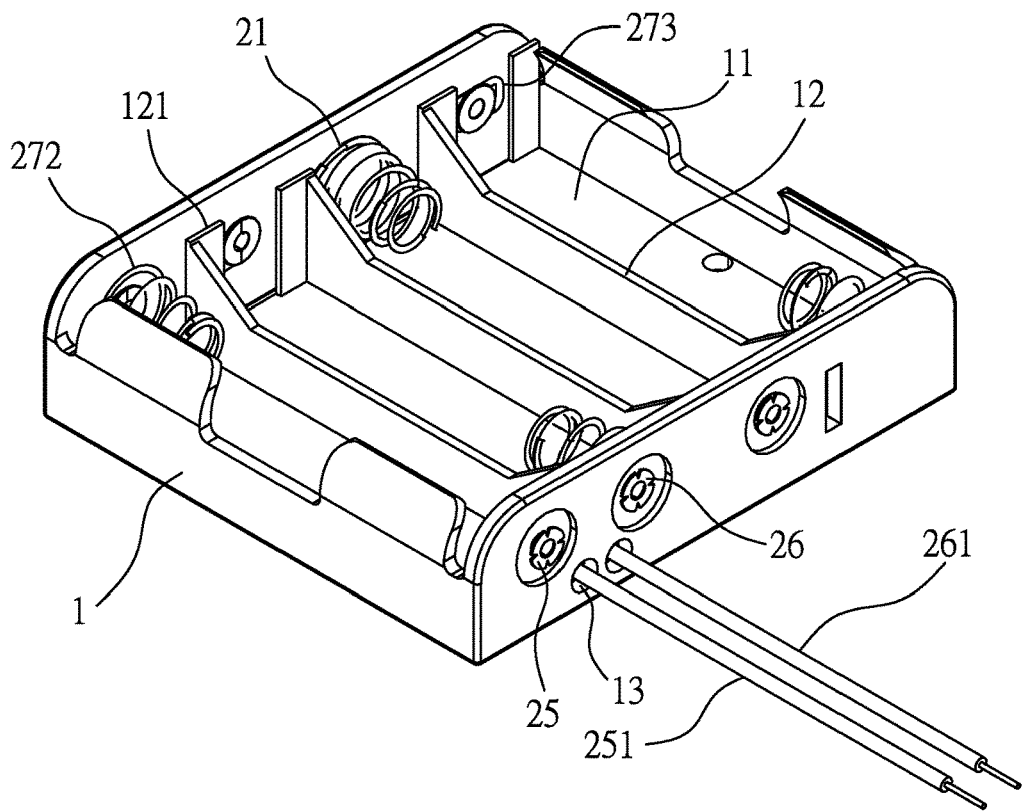
FIG. 7 is a perspective view illustrating the assembly of the battery holder of FIG. 6.
Figure 8:
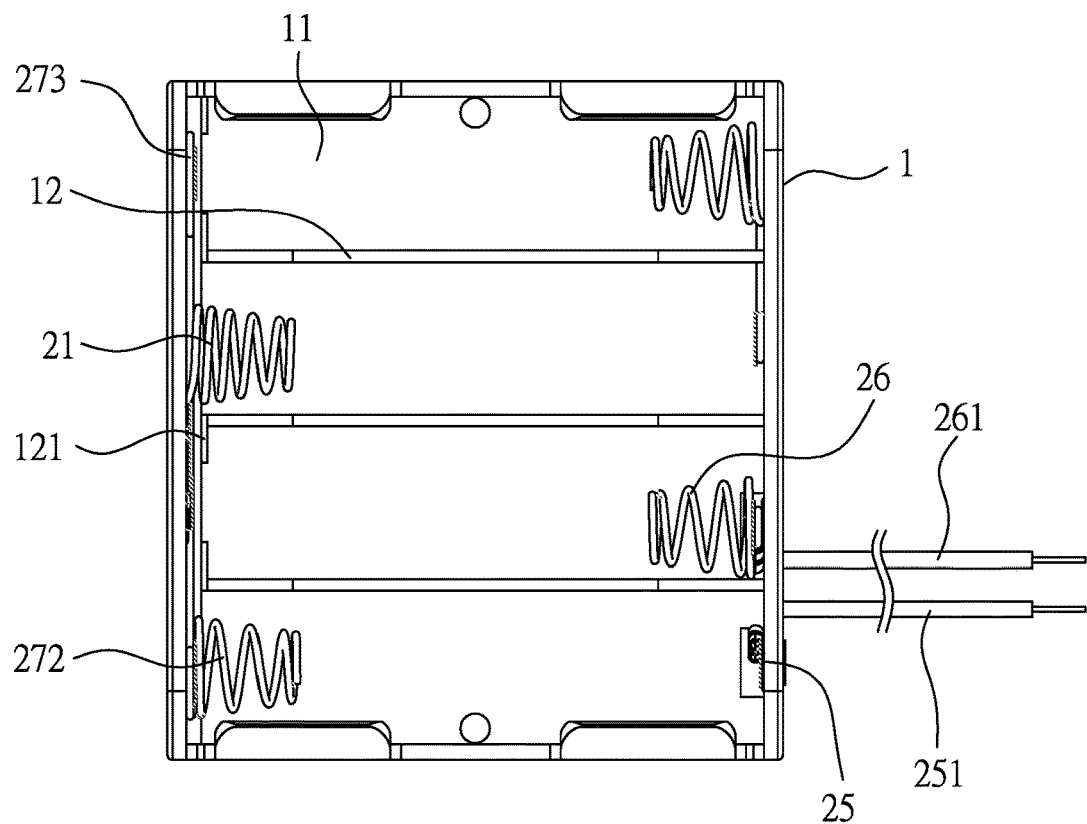
FIG. 8 is a top view illustrating the assembly of the battery holder according to the second embodiment of the present invention.

Please refer from FIG. 6 to FIG. 8, which discloses a second embodiment of the battery holder, the same components shared by the second embodiment and the first embodiment are provided with the codes, because there are a lot of the components shared by the second embodiment and the first embodiment, only differences between the two embodiments are illustrated as follows.

A top surface defined between the two battery chambers 11 arranged at the outer sides of the case body 1 is transversally formed with an accommodation slot 14 allowing the anode/cathode jumping unit 27 to be installed; as such, the two communication slots 141 disclosed in the first embodiment are not required in the second embodiment. Advantages achieved by this embodiment are that the accommodation slot 14 is formed inside the case body 1, so that dangers caused by a short circuit status on a bottom surface of the case body 1 can be prevented.

Moreover, the partition plate 12 arranged between every two adjacent battery chambers 11 is perpendicular to the accommodation slot 14, and a position corresponding to an anode protrusion (known as prior art therefore not shown in figures) of a battery located between every two adjacent partition plates 12 and above the case body 1 is vertically extended with a pair of abutting sheets 121 allowing the anode protrusion to pass therebetween, so that the anode protrusion is able to be in contact with the anode contact point 273 or the anode/cathode connecting unit 21.

Figure 10:
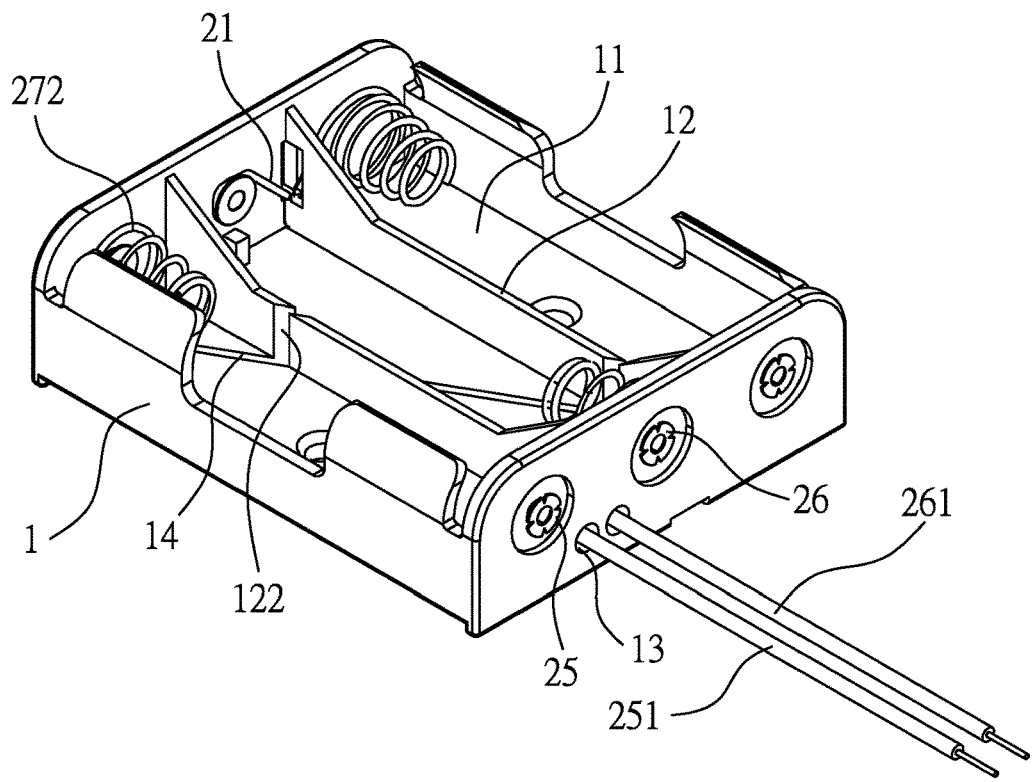
FIG. 10 is a perspective view illustrating the assembly of the battery holder of FIG. 9.
Figure 11:
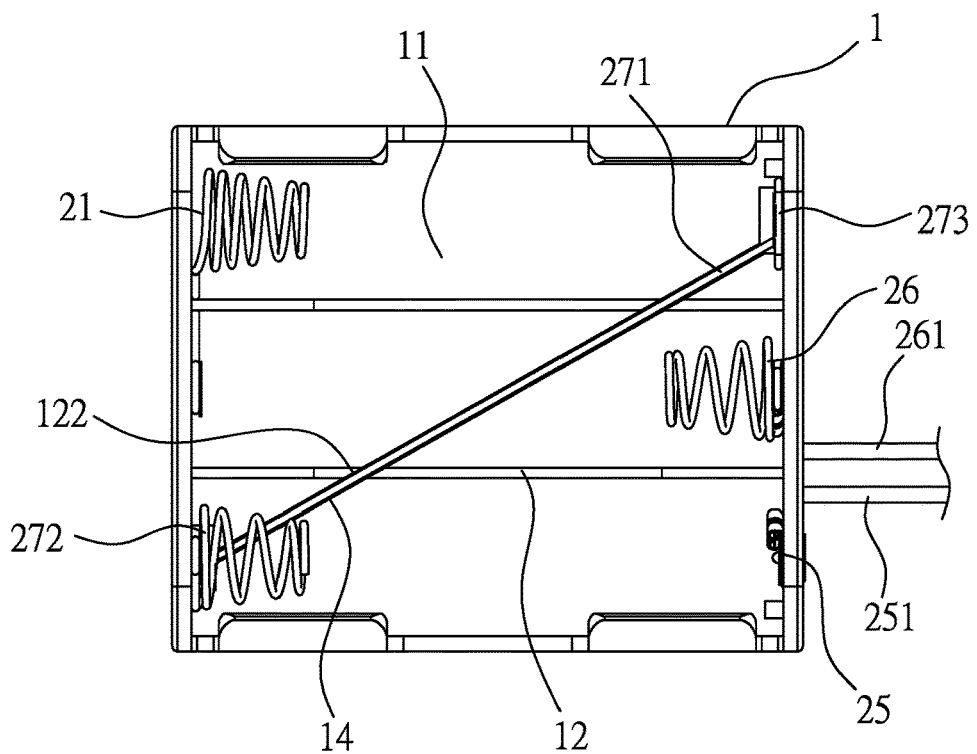
FIG. 11 is a top view illustrating the assembly of the battery holder according to the third embodiment of the present invention.

Please refer from FIG. 9 to FIG. 11, which discloses a third embodiment of the battery holder, the same components shared by the third embodiment and the first embodiment are provided with the codes, because there are a lot of the components shared by the third embodiment and the first embodiment, only differences between the two embodiments are illustrated as follows.

The quantity of the at least three battery chambers 11 is an odd number equal to or greater than three, for example three battery chambers 11, a top surface defined between the two battery chambers 11 arranged at the outer sides of the case body 1 is diagonally formed with an accommodation slot 14 allowing the anode/cathode jumping unit 27 to be installed. Advantage of this embodiment is that the accommodation slot 14 is formed inside the case body 1, so that dangers caused by a short circuit status on a bottom surface of the case body 1 can be prevented.

Moreover, the partition plate 12 is arranged between every two of the adjacent battery chambers 11 in the case body 1, the partition plate 12 is longitudinally formed with a crossed slot 122, in an opened status, at a path where the accommodation slot 14 passes, so that the connection segment 271 is able to longitudinally pass each of the crossed slots 122 so as to be accommodated in the accommodation slot 14.

Please refer to FIG. 12 to FIG. 15, which discloses a fourth embodiment of the battery holder, the same components shared by the fourth embodiment and the second embodiment are provided with the codes, because there are a lot of the components shared by the fourth embodiment and the second embodiment, only differences between the two embodiments are illustrated as follows.

Figure 14:
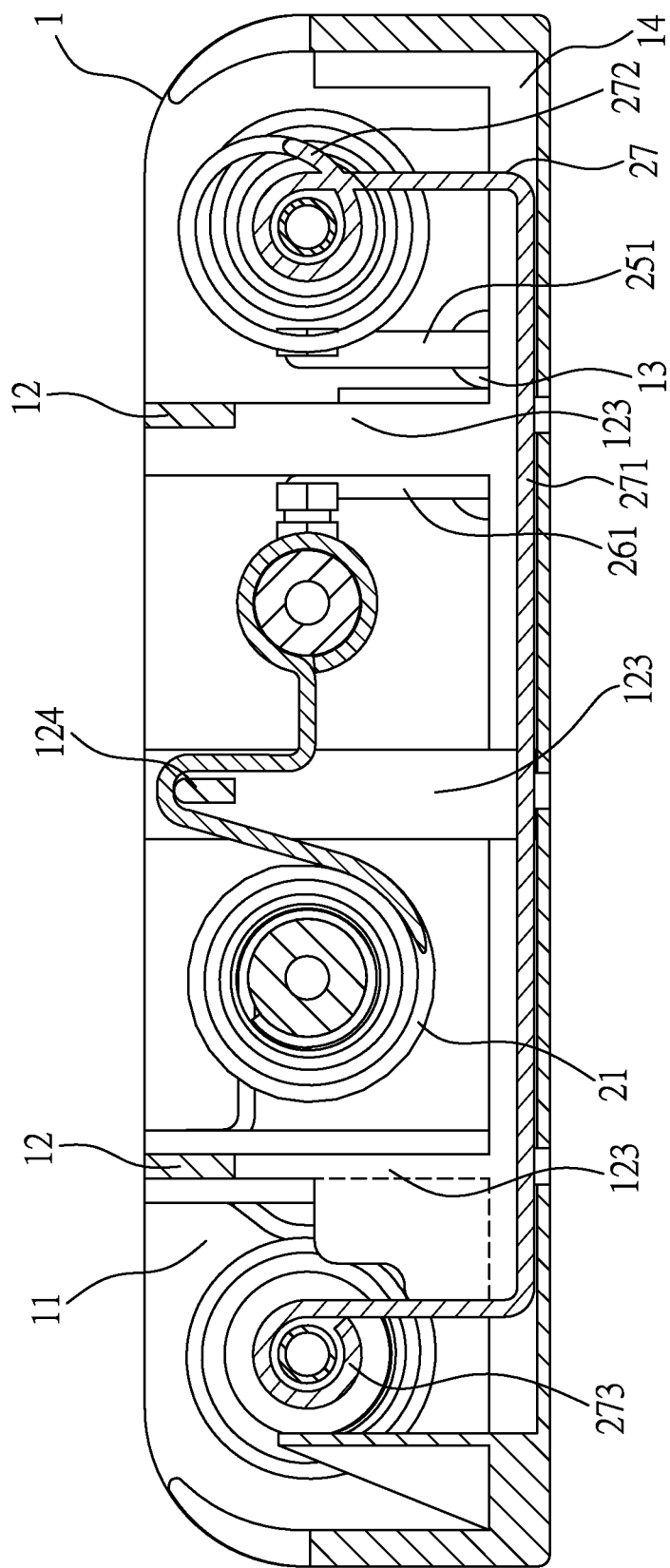
FIG. 14 is a cross sectional view of FIG. 13 taken along an A-A line.
Figure 15:
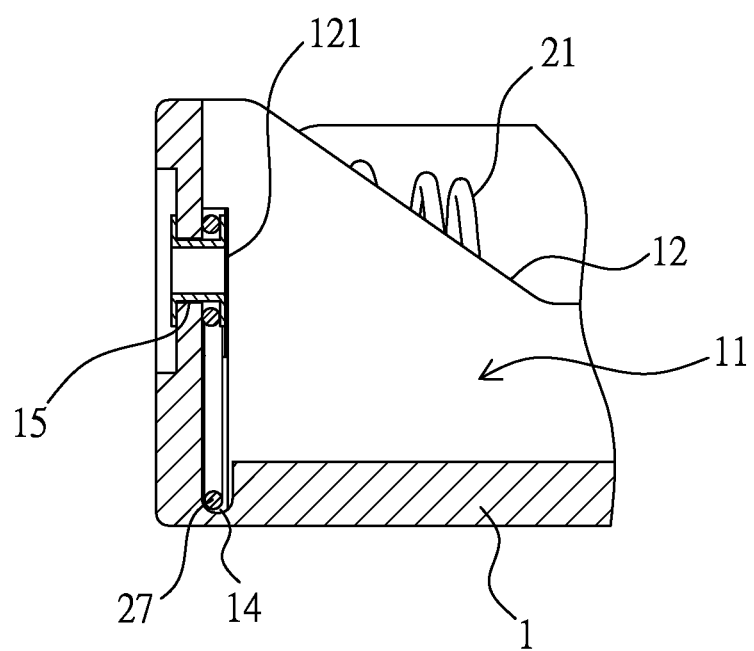
FIG. 15 is a cross sectional view of FIG. 13 taken along a B-B line.

As shown in FIG. 12, FIG. 14 and FIG. 15, the accommodation slot 14 is transversally formed on a top surface defined between two of the at least three battery chambers 11 which are arranged at the outer sides, a plate slot 123 allowing the anode contact point 273 of the anode/cathode jumping unit 27 to pass is respectively formed at a location defined between the two battery chambers 11 arranged at the outer sides and at a location defined at the partition plates 12 arranged at a same side with respect to the accommodation slot 14.

Moreover, a hanging segment 124, which can be communicated with each other, is integrally disposed at a location defined between the partition plate 12 disposed corresponding to the at least one anode/cathode connecting unit 21 and the case body 1, thereby allowing each of the anode/cathode connecting units 21 to be in a hanging status, so that a riveting operation can be assisted. What shall be addressed is the hanging segment 124 is not limited to be applied in this embodiment; besides the second embodiment, the hanging segment 124 can also be applied in the first embodiment, the third embodiment and a fifth embodiment.

When being assembled, the anode contact point 273 firstly passes through the plate slot 123 of each of the partition plates 12 between the two battery chambers 11 arranged at the outer sides, so that the connection segment 271 is able to be accommodated in the accommodation slot 14, and the cathode elastic contact point 272 is riveted in the connection hole 15 of the case body 1, then the anode contact point 273 is riveted in the another connection hole 15 of the case body 1, so that the at least one anode/cathode connecting unit 21, the anode output terminal 25, the cathode output terminal 26 and the anode/cathode jumping unit 27 are assembled as the connection assembly 2.

Figure 17:
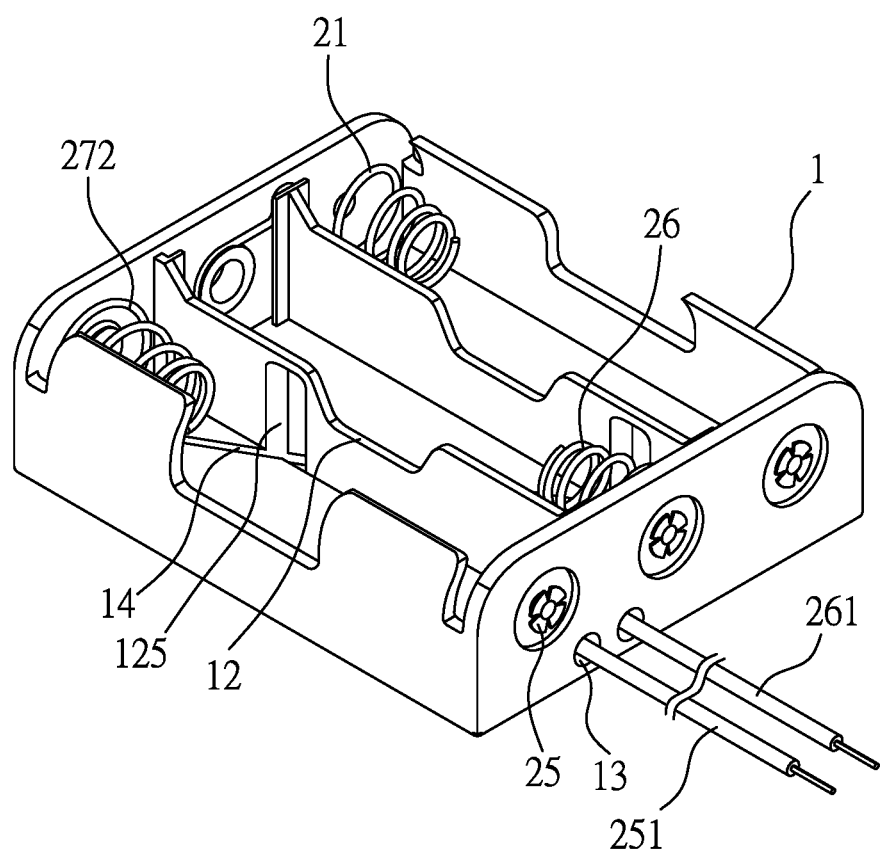
FIG. 17 is a perspective view illustrating the assembly of the battery holder of FIG. 16.

Please refer to FIG. 16 and FIG. 17, which discloses a fifth embodiment of the battery holder, the same components shared by the fifth embodiment and the third embodiment are provided with the codes, because there are a lot of the components shared by the fifth embodiment and the third embodiment, only differences between the two embodiments are illustrated as follows.

The partition plate 12 is provided between every two of the adjacent battery chambers 11 in the case body 1 for partition, the partition plate 12 is longitudinally formed with a penetrated slot 125, in a closed status, at a path where the accommodation slot 14 passes, so that the connection segment 271 is able to transversally pass each of the penetrated slots 125 so as to be accommodated in the accommodation slot 14.

Advantages achieved by the second embodiment, the third embodiment, the fourth embodiment and the fifth embodiment are that the accommodation slot 14 is formed inside the case body 1, so that dangers caused by a short circuit status due to the anode/cathode jumping unit 27 being exposed can be prevented.

Based on what has been disclosed above, advantages achieved by the present invention are as follows: the anode/cathode jumping unit formed through a metal wire, for example a steel spring wire, being bent is utilized for replacing the conventional assembly of the anode contact point, the cathode contact point and the flexible hook-up wire, and the anode/cathode jumping unit is installed from the top end of the case body, thus the complicated assembly procedure of the battery holder being reversely disposed and a hole alignment operation being difficult to be processed are overcome. Accordingly, the battery holder capable of simplifying assembly procedure provided by the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A battery holder capable of simplifying assembly procedure, including:
   a case body, having at least three battery chambers, and
   a connection assembly, having at least one anode/cathode connecting unit, an anode output terminal, a cathode output terminal and an anode/cathode jumping unit, thereby allowing said at least three battery chambers to be in a serial connecting status;
   wherein said battery holder is characterized in that: an accommodation slot is formed between two battery chambers of said at least three battery chambers which are arranged at outer sides, said anode/cathode jumping unit is formed through a metal wire being bent, and has a connection segment accommodated in said accommodation slot, one end of said connection segment has a cathode elastic contact point connected to a first battery chamber of said two battery chambers arranged at said outer side, and another end thereof has an anode contact point connected to a second battery chamber of said two battery chambers arranged at said outer side.

2. The battery holder capable of simplifying assembly procedure as claimed in claim 1, wherein said accommodation slot is transversally disposed on a bottom surface defined between said two battery chambers arranged at said outer sides, and two ends of said accommodation slot are respectively formed with a communication slot at locations corresponding to said two battery chambers arranged at said outer sides and allowing said anode contact point to pass.

3. The battery holder capable of simplifying assembly procedure as claimed in claim 1, wherein said accommodation slot is transversally disposed on a top surface defined between said two battery chambers arranged at said outer sides; wherein a partition plate is provided between every two adjacent battery chambers of said at least three battery chambers for partition, wherein said partition plate is perpendicular to said accommodation slot, and a position corresponding to an anode protrusion of a battery located between every two adjacent said partition plates and above said case is vertically extended with a pair of abutting sheets allowing said anode protrusion to pass therebetween.

4. The battery holder capable of simplifying assembly procedure as claimed in claim 1, wherein said accommodation slot is transversally disposed on a top surface defined between said two battery chambers arranged at said outer sides; wherein a partition plate is provided between every two adjacent battery chambers of said at least three battery chambers for partition, a plate slot is respectively formed at a location defined between said two battery chambers arranged at said outer sides and at a location defined at said partition plate arranged at a same side with respect to said accommodation slot, and each of said plate slots allows said anode contact point to transversally pass.

5. The battery holder capable of simplifying assembly procedure as claimed in claim 1, wherein said accommodation slot is diagonally disposed on a top surface defined between said two battery chambers arranged at said outer sides; wherein a partition plate is provided between every two adjacent battery chambers of said at least three battery chambers for partition, each of said partition plates is longitudinally formed with a crossed slot, in a opened status, at a path where said accommodation slot passes, so that said connection segment is able to longitudinally pass each of said crossed slots so as to be accommodated in said accommodation slot.

6. The battery holder capable of simplifying assembly procedure as claimed in claim 1, wherein said accommodation slot is diagonally disposed on a top surface defined between said two battery chambers arranged at said outer sides; wherein a partition plate is provided between every two adjacent battery chambers of said at least three battery chambers for partition, each of said partition plates is longitudinally formed with a penetrated slot, in a closed status, at a path where said accommodation slot passes, so that said connection segment is able to transversally pass each of said penetrated slots so as to be accommodated in said accommodation slot.

7. The battery holder capable of simplifying assembly procedure as claimed in claim 1, wherein said metal wire is a steel spring wire; and said anode contact point has a frame member formed in a geometrical shape.

8. The battery holder capable of simplifying assembly procedure as claimed in claim 7, wherein said frame member is formed in a rectangular shape or in an annular shape.

9. The battery holder capable of simplifying assembly procedure as claimed in claim 1, wherein a partition plate is provided between every two adjacent battery chambers of said at least three battery chambers for partition, and a hanging segment, which is able to be communicated with each other, is integrally disposed at a location defined between said partition plates disposed corresponding to each of said anode/cathode connecting units and said case body, thereby allowing each of said anode/cathode connecting units to be in a hanging status.

10. The battery holder capable of simplifying assembly procedure as claimed in claim 1, wherein said anode output terminal has an anode conduction hook-up wire, and said cathode output terminal has a cathode conduction hook-up wire; said anode conduction hook-up wire and said cathode conduction hook-up wire are protruded out from a penetrated hole respectively formed in said two adjacent battery chambers, so that said anode conduction hook-up wire and said cathode conduction hook-up wire are adjacently arranged.

\* \* \* \* \*